United States Patent [19]
Mantovan et al.

[11] Patent Number: 6,122,947
[45] Date of Patent: Sep. 26, 2000

[54] BAR DEBURRING PLANT

[75] Inventors: Gianfranco Mantovan, Busto Arsizio; Giuseppe Ferrario, Legnano, both of Italy

[73] Assignee: Techint Compagnia Tecnica Internazionale S.p.A., Milan, Italy

[21] Appl. No.: 09/061,093

[22] Filed: Apr. 16, 1998

[30] Foreign Application Priority Data

Apr. 17, 1997 [IT] Italy .................................. MI97A0888

[51] Int. Cl.⁷ .......................... B21B 45/04; B21D 43/00; B21D 43/16
[52] U.S. Cl. .................................. 72/39; 72/419; 72/428
[58] Field of Search ................................. 72/39, 40, 419, 72/428, 340, 341

[56] References Cited

U.S. PATENT DOCUMENTS

| | | | |
|---|---|---|---|
| 3,554,363 | 1/1971 | Elineau | 198/219 |
| 5,095,726 | 3/1992 | Mackall et al. | 72/40 |
| 5,103,663 | 4/1992 | Shafer et al. | 72/40 |

Primary Examiner—Rodney A. Butler
Attorney, Agent, or Firm—Oblon, Spivak, McClelland, Maier & Neustadt, P.C.

[57] ABSTRACT

A bar deburring plant for cut to size round bars, comprising: a first roller feed path of cut bars towards an alignment element of one first end of said bars, a first transfer element of said bars, with said first aligned end, to a conveyor of said bars, which are spaced one after the other, said conveyor carries said first ends of said aligned bars under a brushing head, a second roller feed path of said cut bars going towards a second alignment element of the second end of said bars, a second transfer element of said bars, with said second aligned end, to a second conveyor of said bars, which are spaced one after the other, said conveyor carries said second ends of said aligned bars under a second brushing head.

14 Claims, 9 Drawing Sheets

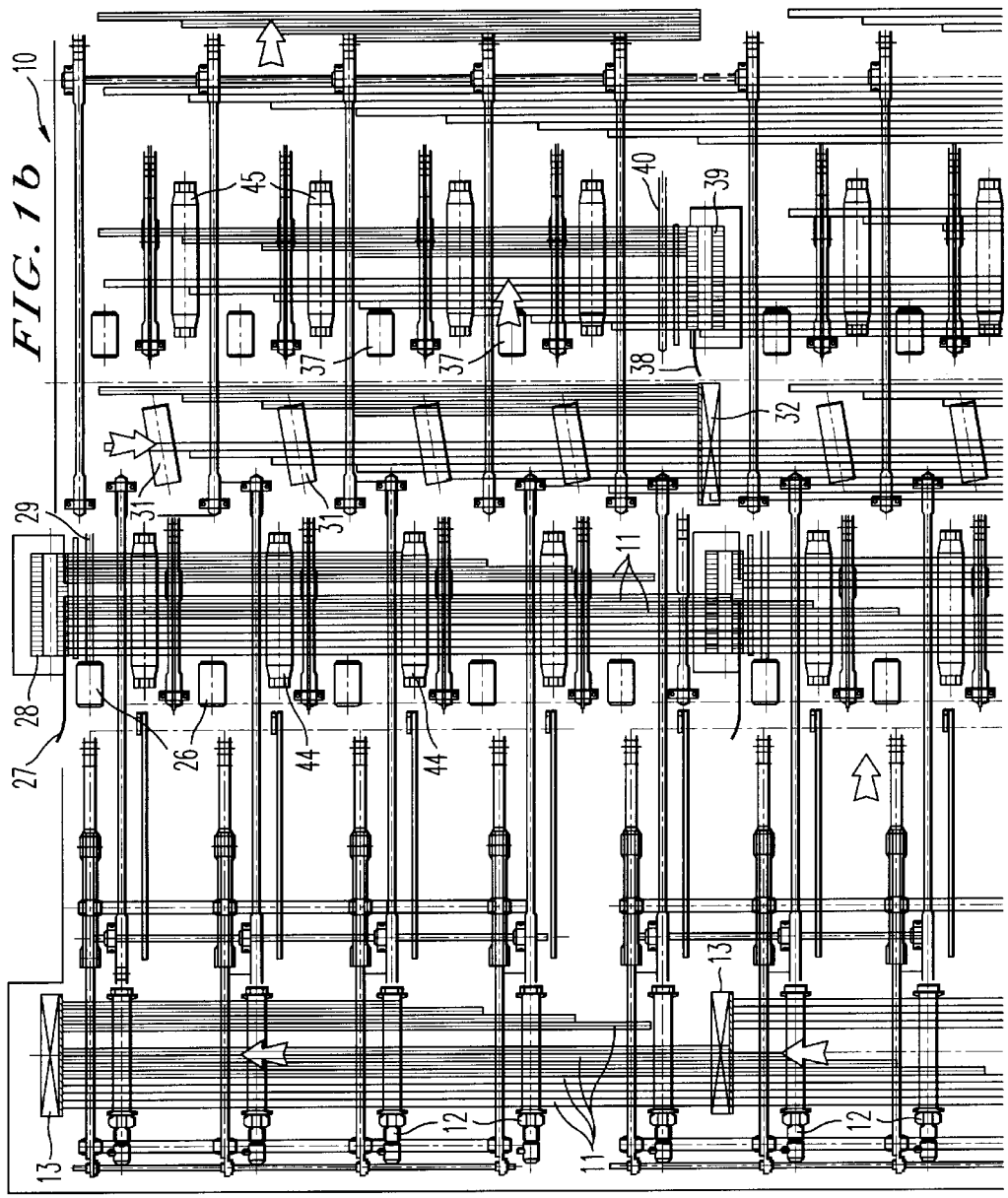

BAR DEBURRING PLANT

The present invention refers to a bar deburring plant, in particular for cut to size round bars.

In order to realise bars or products, particularly with a round cross section, according to the various required commercial lengths, a continuous product of said shape is cut to the required sizes. The cutting operation for these round products, which have a diameter comprised between 22 and 152.4 mm and a length comprised between 4 and 15 m, is performed when the products comes out from a finishing rolling mill train.

The continuous product is cut at a cutting station which provides, for instance, a metallic or other suitable disk cutter. During the cutting operation, a burr is formed on the front and on the rear cut portion of the material.

The cut is executed on a layer of bars and the burr has elongated and irregular shapes on the bar side where the cutting operation ends. In some cases, the burr length can reach about 1.5–2 mm.

As a consequence, there is the problem to remove said burrs on the product both from the front and from the rear portion of the single bar.

Currently, the removal of the burr is obtained outside the manufacturing line at the end of the rolling mill process, through visual selection of the largest burrs and their removal. The removal is accomplished by means of a grinding wheel or other tools by the workers assigned to the packaging of the bar bundles or by means of specific automated equipments which operate directly on the bars.

In fact, the bars coming from the rolling mill train have to be arranged in bundles, carried to the deburring area, set free in order to be handed one by one, deburred and then packaged again.

It is clear that this way to proceed will require the presence of workers, even in significant number, to sustain the plant productivity. However, such way to proceed outside the manufacturing line, implies that the bars will have to be handled twice before reaching the final packaging operation.

Therefore, a purpose of the present invention is to solve this problem and to overcome the other above mentioned disadvantages of the known art and to reach said purpose through a very simple and inexpensive process, as well as particularly functional and, above all, reliable.

A further purpose is to automatize the deburring operation, and to simultaneously eliminate expensive man-hours and obtain the deburring.

A further purpose is to coordinate the deburring operation with the rolling mill production, since the rolling mill production is variable in function of the type of product.

In consideration of the above purposes, and according to the present invention, a bar deburring plant, in particular for round bars cut to size, has been realised according to the features disclosed in the claims herein attached.

The structural and functional features of the present invention and its advantages in comparison to the known art will be better understood and appreciated from the following description, referred to the attached drawings, which show an example of bar deburring plant, realised according to the invention.

In the drawings:

FIG. 1b is a top plan view of a second portion which completes the bar deburring plant shown in FIG. 1a;

Figure 5:
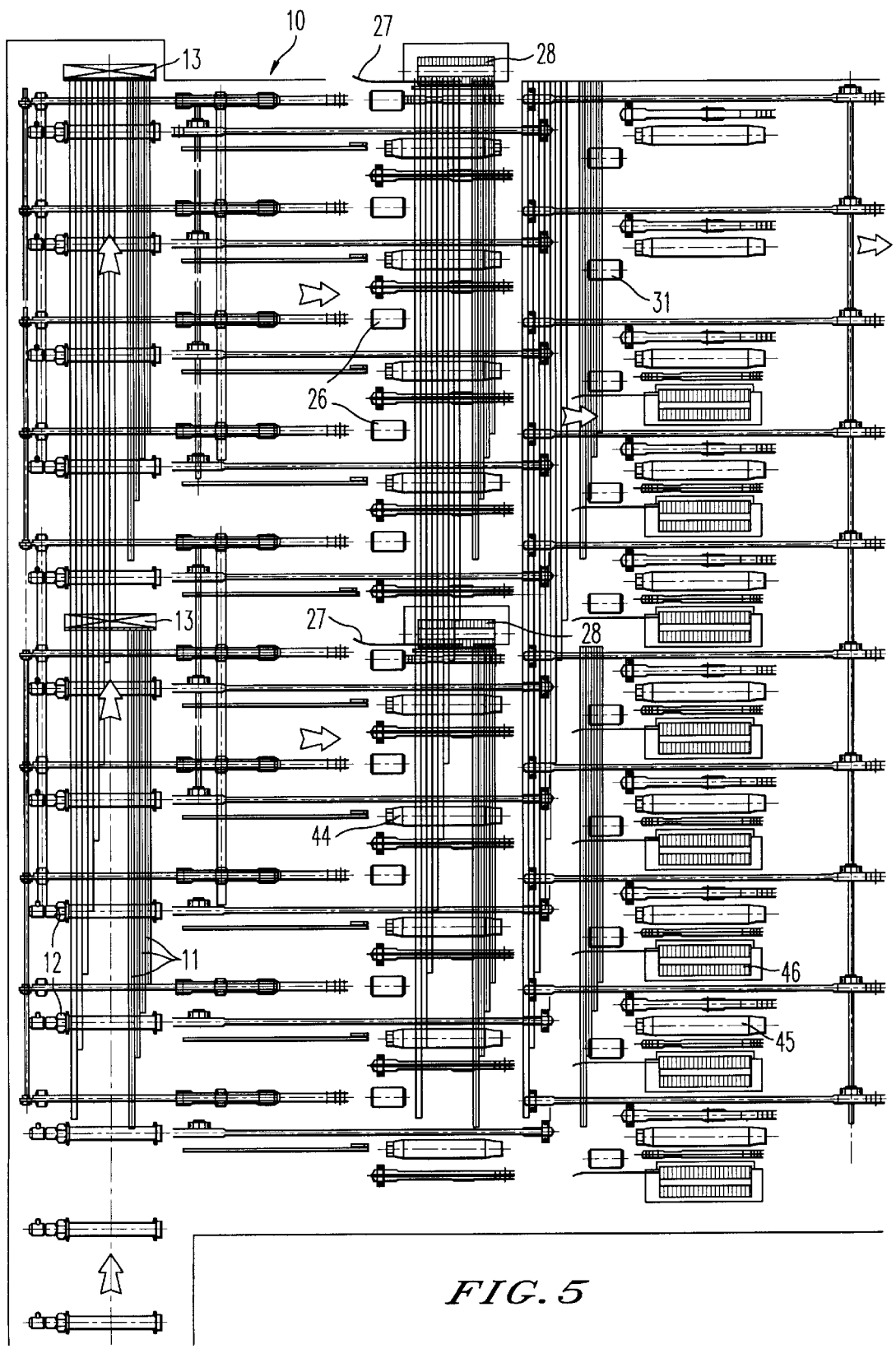
Figure 6:
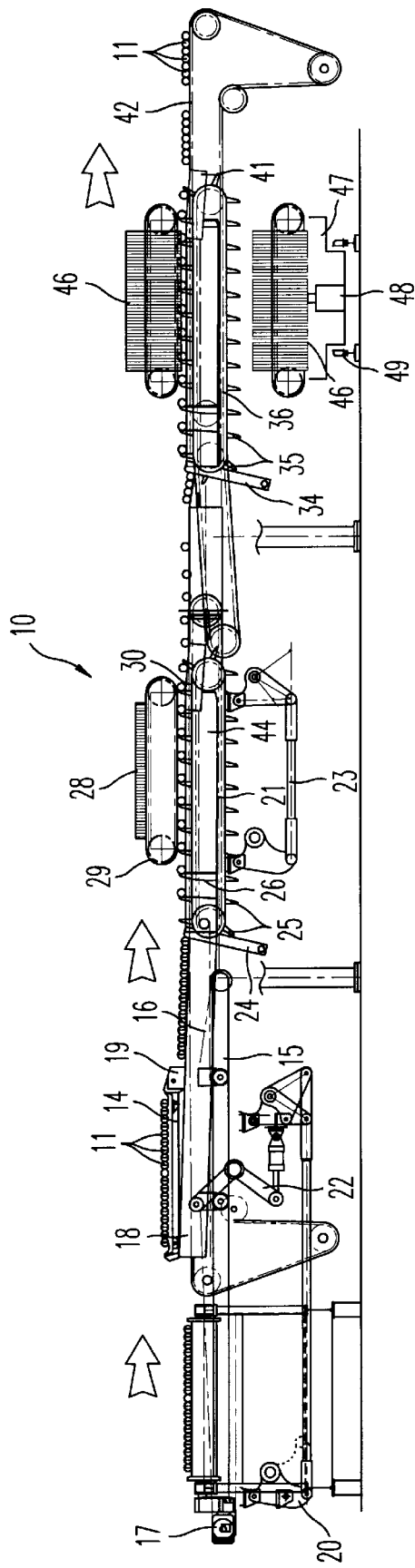

FIG. 5 is a plan view of an end portion of a plant according to the present invention in a second embodiment with a mobile brush for the rear end of the bars; and FIG. 6 is a side elevation section of the second embodiment of the bar deburring plant of the invention with a mobile brush shown in its lifted position with a continuous line and shown in its lowered position with a dash and dotted line.

Figure 1A:
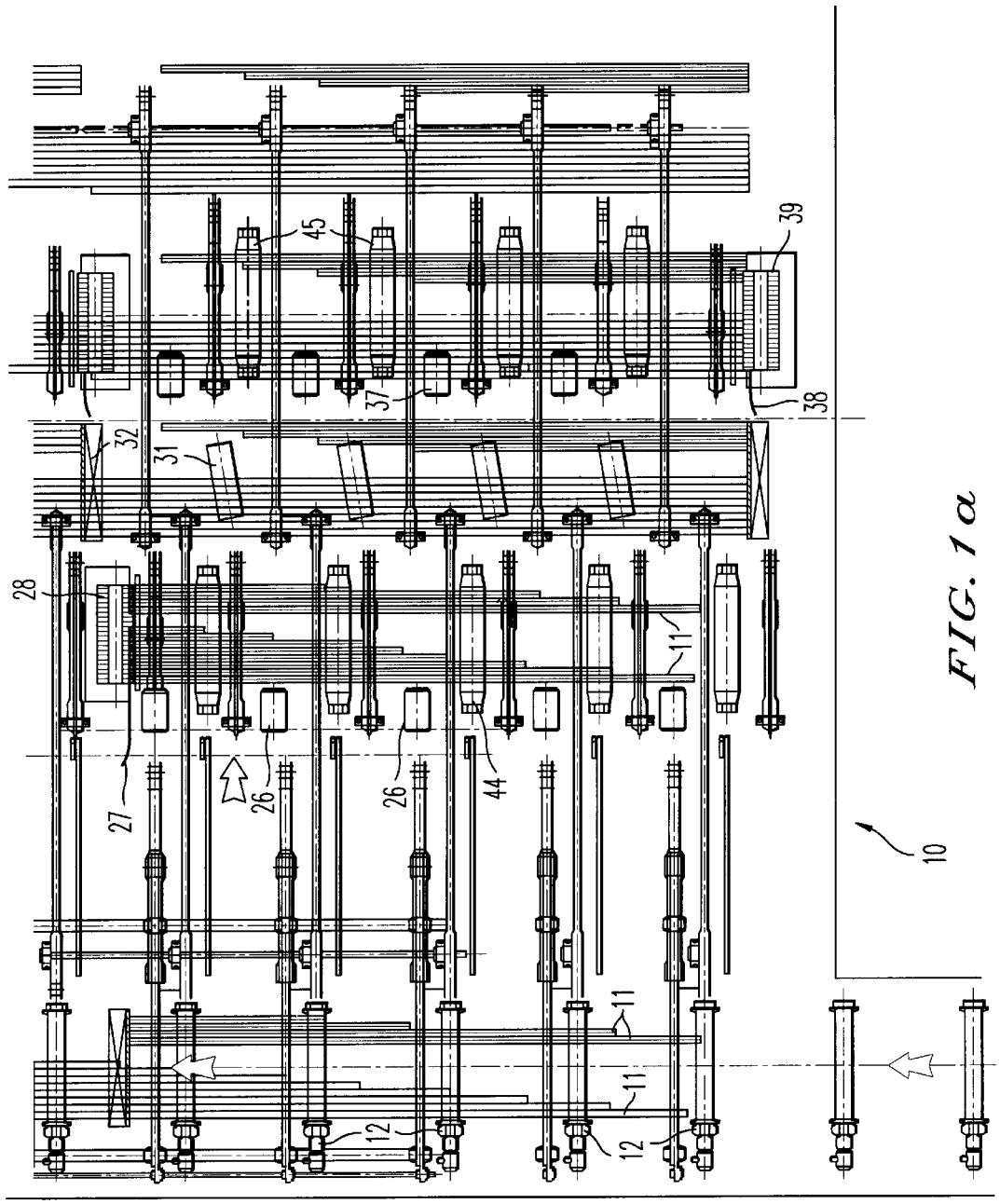
FIG. 1a is a top plan view of a first portion of a bar deburring plant, in particular round bars cut to size, according to the invention.

With reference to the drawings, the bar deburring plant of the invention is indicated with numeral 10 and comprises, in the example shown in FIGS. 1a and 1b according to the invention, a first deburring area of one end of a series of cut bars 11 and a second deburring area of the second end of a series of said cut bars 11.

In the plant scheme shown in said figures there are even two areas both for the deburring of the first end of the fed cut bars and for the deburring of the second end of the same cut bars.

The cut bars 11 are fed through a path with motor driven rollers (12) or discharge path from a bar cutter (not shown), said bars arrive directly from a rolling mill train (not shown) without any handling. A plant according to the invention is therefore advantageously located inside the production line.

The cut bars 11 are positioned with their front ends perfectly aligned together against an end run wall 13 or an alignment wall of the first ends of the bars.

Figure 2A:
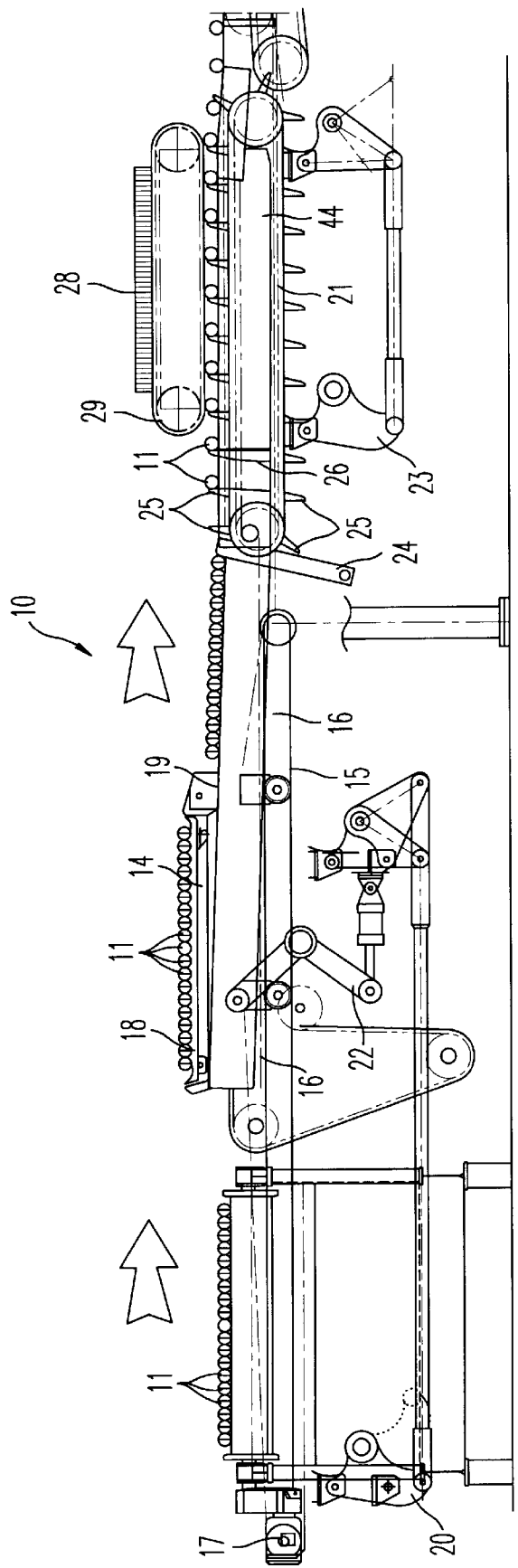
FIG. 2a is a schematic side elevation section of a first half of the bar deburring plant of the invention.
Figure 3:
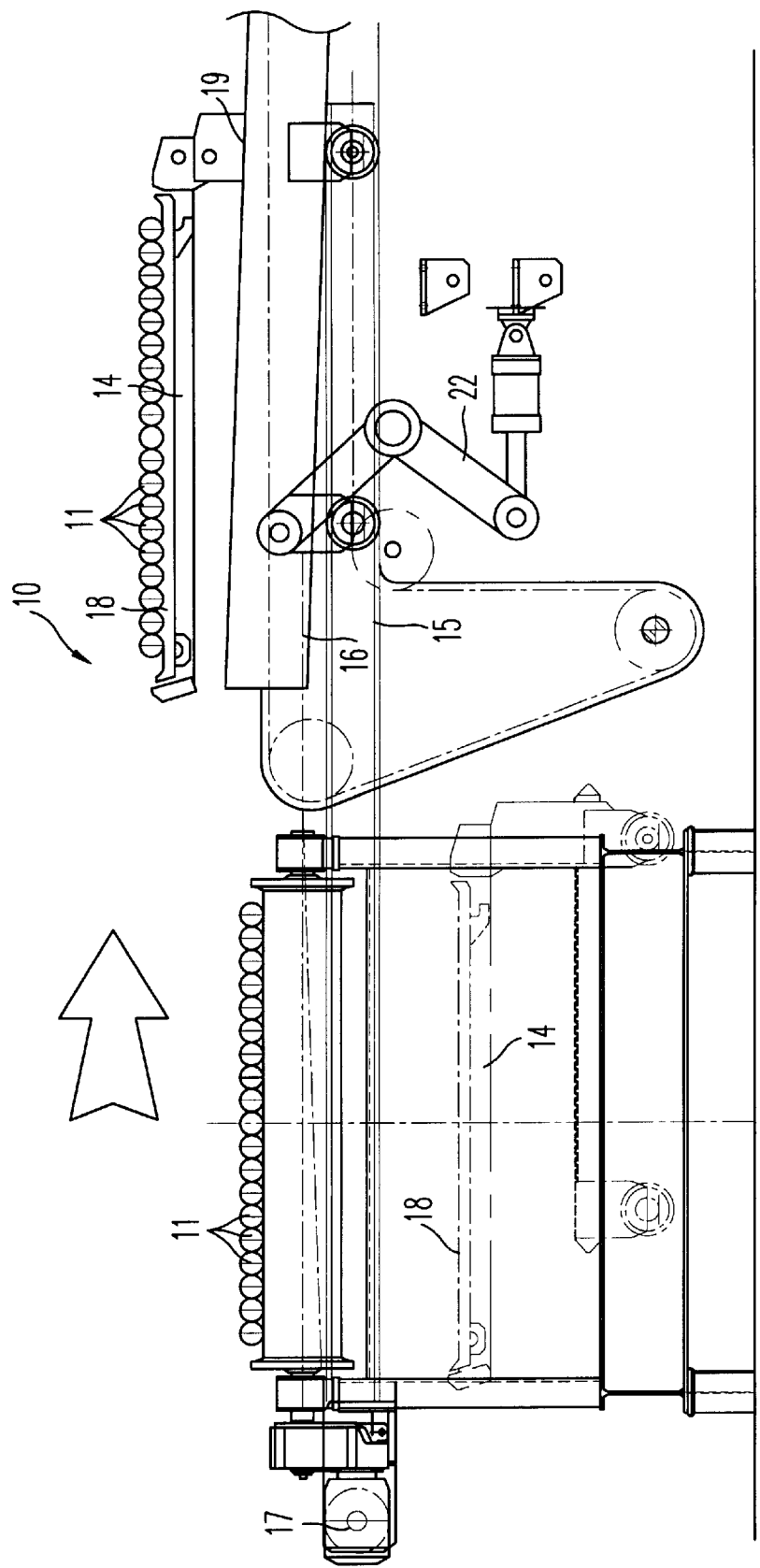
FIG. 3 shows a detail of FIG. 2a wherein the trolley is in its lowered position, ready to receive the bars coming from the roller path.

As better shown in FIGS. 2a and 3, under the roller path 12 there is provided a transfer element of the bars 11 which have their first end aligned. This transfer element comprises a trolley 14, which can slide forth and back on tracks 15 an which is pulled by chains 16 engaged to its opposite ends and driven by a gearmotor 17.

The trolley 14, initially in its lowered position (FIG. 3) below the roller path 12, takes up, holds on its plane 18 and lifts the group of cut bars 11 positioned against the end run wall 13 (FIG. 2a). Through a rotation and a translation, the trolley 14 discharges the group of cut bars 11 on a chute 19.

The taking up and discharging operations are possible since the tracks 15 and the trolley 14 can be lifted and lowered by means of a lever mechanism 20 positioned below the roller path 12.

The group of cut bars 11 rolls by force of gravity towards a conveyor pintle chain 21, due to the slant of the chute 19. The chute slant is adjustable through another lever mechanism below, driven by an actuator 22, the height of the pintle chain 21 is adjustable as well through a further lever mechanism 23 below. In this arrangement, bars with different diameters can be treated.

At the front end of the pintle chain 21 a device 24 is positioned to separate the cut bars 11 one by one towards the pintles 25 (pushing elements) of the closed ring chain 21, wherein the device is similar to a ratchet.

Always in correspondence to said end of the pintle chain 21 there is a motor drive roller path 26 which acts on the single bars 11 received from the pushing elements 25 of the chain 21.

The motor driven roller path 26 provides, if necessary, to restore the head alignment of the single bars 11 by pushing them against a flat element of alignment 27.

In this way the single bars 11, carried by the pushing elements 25, are precisely positioned and ready to be carried under the brushing head.

The chain 21, with the bars 11 carried by the various pushing elements 25, goes under a first brushing head formed by a roll with a steel brush 28. The bars are also accompanied by an upper chain 29, which presses the bars 11 while they advance.

Further, the upper chain 29, since it rotates at a rim speed higher than the one of the lower pintle chain 21, causes the bars to rotate and to be exposed to the brushing along the entire perimeter of their ends. The deburring is obtained through melting of the material caused by the brushing action.

During this transfer, in the brushing phase, the bars slide also on the underneath motor driven rolls 44 which can oppose the pushing action of the brush roll 28, and maintain the ends of the bars to be brushed in their proper working position.

Then, the cut bars 11, deburred on the first head end, are discharged from the pintle chain 21 and are transferred on a chute 30.

Below said chute 30, another path with motor driven rolls 31, which rotate in the direction opposite to the direction of transfer of the material coming from the cutting machine, proceed to the head alignment of the bars 11 in respect to the second end or rear end.

These driven rolls 31 have a slanting axis, at an angle of about 10°, preferably 7°, in order to give to the bars 11 a motion component perpendicular to said roller path 31. In this way, the following bar can be positioned on the roller path 31 without interfering with the preceding bar 11.

The rear ends of the single bars 11 carried by he roller path 31 reach a further alignment element formed by a run end wall 32 and said ends are therefore perfectly aligned.

Then the bars 11 one by one, are transferred over a further short chute 33, which has the function, together with the path with inclined rolls 31, of the transfer element of the bars having their second end aligned. The bars 11 are then transferred towards a further device 34 to separate the cut bars 11 one by one and towards the pintles (pushing elements) 35 of another chain 36. As above the device to separate the single bars can be similar to a ratchet and is positioned at the front end of this pintle chain 36. The chute 33 is also suitable as a plane to collect the bars to be brushed along the second end or rear end.

A motor driven roller path 37, which operates on the single bars 11 received from the pushing element 35 of the pintle chain 36, is positioned in correspondence to said end of said second pintle chain 36.

The motor driven roller path 37 aligns the rear end heads of the single bars 11 by pushing them, if needed, against an alignment plane 38.

In this way the single bars 11, pulled by the pushing elements 35, are exactly positioned and ready to be carried under the second brushing head by the second pintle chain 36.

The bars 11, pushed by the various pushing elements 35, go below the second brushing head, also formed by a steel brush roll 39. The bars, also in this case, are accompanied by an upper chain 40, which exercises a pressure on the bars 11 advancing under the brush.

As above, the upper chain 40 rotates at a higher rim speed than the lower pintle chain and therefore causes a rotation of the bars. In this way, the bars undergo the brushing along their whole perimeter also in the case of their rear ends. Again, as in the preceding case, the height of the pintle chain 36 is adjustable by means of a corresponding mechanisms 43 below.

Thanks to this adjustment it is possible to treat bars of different diameters.

Further, during this transfer in the brushing phase, the bars slide also on driven rolls 45 below which oppose the push force exercised by the brush roll 39 so as to maintain the final end of the bars to be brushed in their working position.

Finally, the cut bars 11, deburred first on the first front end and then on the second rear end, are discharged from the pintle chain 36 itself.

The bars 11, finished and completely deburred on the front and rear end, slide through a chute 41, to the end portion of a conveyor outlet chain 42. This conveyor chain 42 is slower than the pintle chain 36 and therefore allows the regrouping of the bars.

Further said conveyor chain 42 can also be accelerated, after the formation of a single group of bars 11, so as to divide the bars in groups to be stacked inside trolleys, not shown.

Then, a completely automated deburring of the front and rear ends of cut bars has been achieved, said deburring is extremely quick and safe.

Further, the deburring of the bars is achieved independently from their lengths, thanks to the head alignment operation which is performed before the bars reach the brushing heads.

Another further advantage is to be able to treat bars with different diameters simply by adjusting fully automatically the height of the pintle chain under the brushing roll by means of specific lever mechanism below. In this way the purpose mentioned in the preamble of the description has been achieved.

Of course, the embodiments may be different from those shown in the non-limiting examples of the drawings.

In fact, FIGS. 5 and 6 show a second embodiment of an end portion of a bar deburring plant realised according to the present invention, said plant has mobile brushes to deburr the front and rear ends of the bars.

It has to be noted that, instead of the fixed brushing heads with steel brush rolls 39, there is a very similar brush 46, which is located on a trolley 47 which can move on tracks 49 along the roller pack 45.

This trolley slides below the driven rolls 45 up to the area where the ends of the bars 11, to be deburred, are placed, according to their lengths.

Then, the brush 46 is lifted by means of an actuator 48, positioned on the trolley 47, up to a position above the rear end of the bars 11 to be deburred. FIG. 5 shows a series of different positions for such a mobile brush on board the trolley.

In FIG. 6, the mobile brush 46 is shown in full straight line in its lifted position and in chain line in its lowered position.

With this embodiment, the advantage to eliminate the slanting roller path 31, an the corresponding alignment walls 32, for the head alignment of the bars end is obtained.

A further type of operation allowed by the plant of the present invention is the case in which the brushing heads are not necessary since the products coming from the rolling mill do not need any deburring.

Figure 2B:
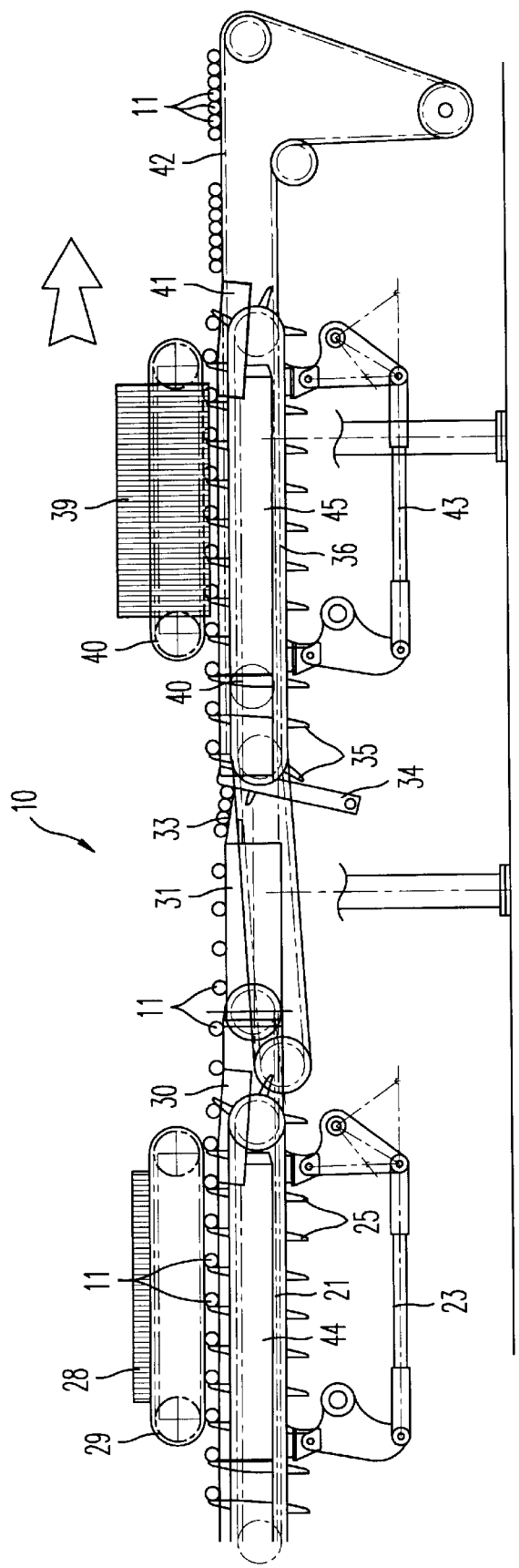
FIG. 2b is a schematic side elevation section of the second half of the bar deburring plant of the invention.
Figure 4A:
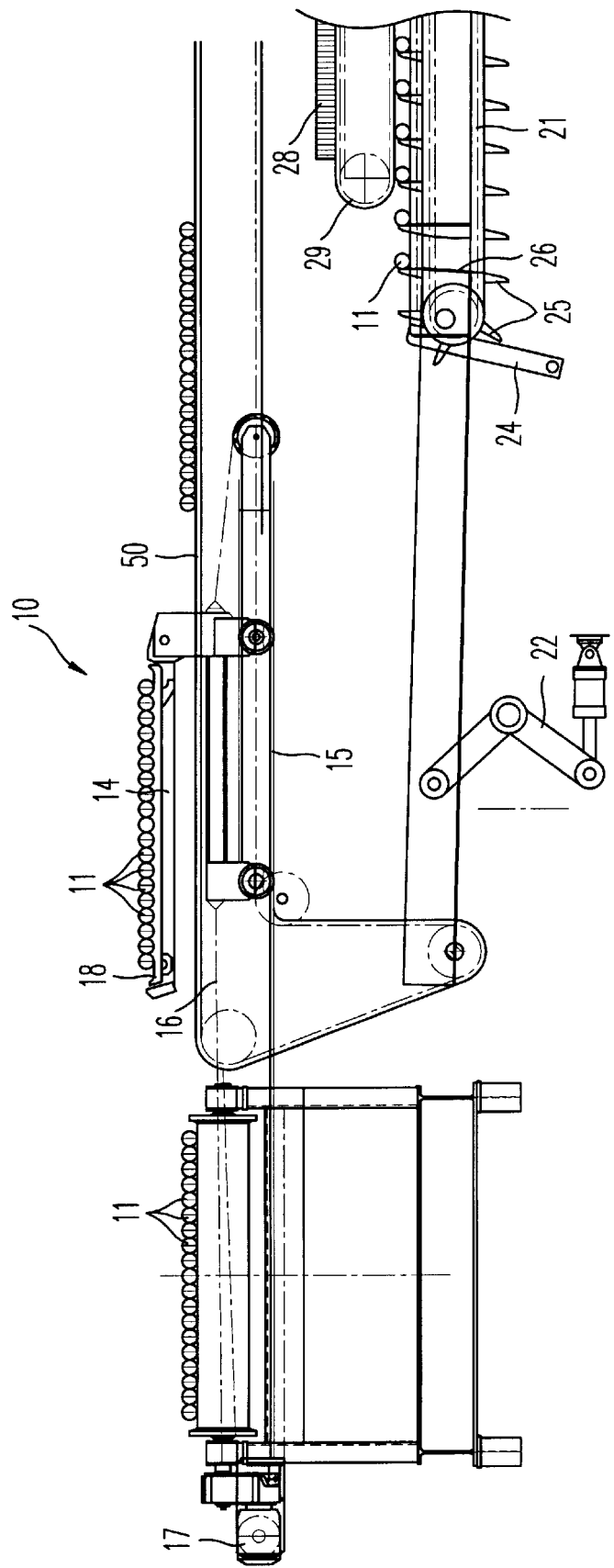
FIGS. 4a and 4b are section views similar to the ones in FIGS. 2a and 2b, wherein some of the portions of the plant are in their lowered positions in order to allow the continuous flow of rolled products which do not need the deburring operation.
Figure 4B:
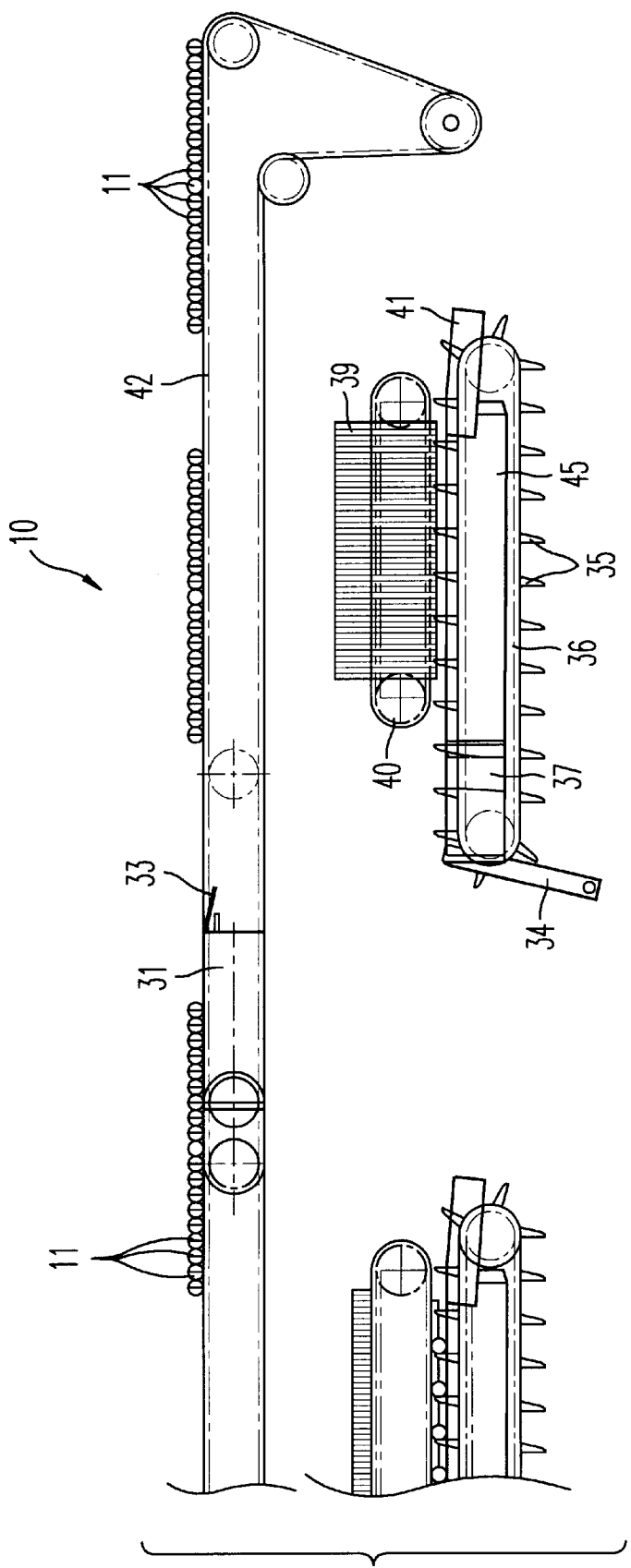

FIGS. 4a and 4b, containing sections similar to the ones of FIGS. 2a and 2b, show how to lower some portions of the plant.

This configuration will allow the continuous flow of rolling mill products 11 which do not need deburring.

In these two Figures the trolley 14 carries the bars 11 from the roller path 12 and discharges them on a front portion 50 of the conveyor chain 42.

This discharge is possible since various other devices, referred to herein and which are part of the plant, have been lowered below said conveyor chain 42 by means of lifting and lowering elements purposely provided.

By means of this conveyor chain 42, the bars 11 can therefore be carried or other products directly to the exit of the deburring area without performing any deburring, if said operation is not needed.

In such case, the conveyor chain 42 can be accelerated to facilitate the clearing operation of the whole plant and to improve the productivity of the rolling mill train connected therein.

According to the present invention, it has been particularly effective to put the deburring plant in series with the rolling mill train.

Also the problem of the synchronisation of the deburring operation with the production coming from the rolling mill train or from the rolling mill has been solved very well.

In fact, it is possible to treat bars or rolling mill products of different sizes (in particular of different lengths) with different flow and advancement speeds.

The protection of the invention is contained in the attached claims.

The Italian priority application No. MI97A 000888 is herein incorporated by reference.

What is claimed is:

1. A bar deburring plant to remove burrs of cut bars, comprising:
    a first alignment element;
    a first roller feed path configured to move the bars toward the first alignment element in a first direction to align one ends of the bars;
    a first transfer element configured to move the bars from the first roller feed path keeping the one ends of the bars aligned;
    a first conveyor configured to convey the bars from the first transfer element;
    a first brushing head configured to brush the one ends of the bars while the first conveyor conveys the bars from the first transfer element;
    a second alignment element;
    a second roller feed path configured to move the bars from the first conveyor towards the second alignment element in a second direction opposite to the first direction to align other ends of the bars;
    a second transfer element configured to move the bars from the second roller feed path keeping the other ends of the bars aligned;
    a second conveyor configured to convey the bars from the second transfer element; and
    a second brushing head configured to brush the other ends of the bars while the second conveyor conveys the bars from the second transfer element.

2. A bar deburring plant according to claim 1, wherein each of said first and second brushing heads comprises a steel brush roll.

3. A bar deburring plant according to claim 1, wherein the first transfer element comprises:
    a track;
    a motor;
    a trolley configured to be moved on the track by the motor, the trolley receiving, lifting and discharging the bars to a chute positioned in front of the first conveyor; and
    a device configured to separate the bars one by one.

4. A bar deburring plant according to claim 1, wherein each of said first and second conveyers comprises a pintle chain provided with pushing elements which are spaced each other.

5. A bar deburring plant according to claim 1, wherein each of said first and second alignment elements comprises an end run wall.

6. A bar deburring plant according to claim 1, further comprising:
    first and second upper pressing elements which cooperate with the first and second conveyers respectively to move the bars.

7. A bar deburring plant according to claim 1, wherein the second element comprises a motor driven roller path having a slant axis and a chute for the bars.

8. A bar deburring plant according to claim 1, wherein a motor driven roller path is associated with an inlet end of each of the first and second conveyers, the roller path, in cp-operation with a flat alignment element, restores alignment of the bars.

9. A bar deburring plant according to claim 1, wherein motor driven rolls are associated with the first and second brushing heads respectively, said rolls opposing push of the brushing heads onto said bars.

10. A bar deburring plant according to claim 1, characterized by providing, together with said transfer element formed by a motor driven trolley which can bo lifted and lowered in respect to said roller path, a conveyor chain to receive said cut bars and transfer them directly to an exit of said plant, the remaining devices of said plant can be lowered below said conveyor chain.

11. A bar deburring plant according to claim 1, wherein said second brushing head is positioned on a trolley which is movable to a plurality of positions on tracks below a motor driven roller path which receives said bars, said second brushing head being configured to be lifted above the bars by means of an actuator.

12. A bar debarring plant according to any of the preceding claims, wherein the bar debarring plant is positioned to be in series with a rolling mill train.

13. A bar deburring plant according to claim 4, wherein each of said first and second conveyers includes a lever mechanism to adjust a height of each of the first and second conveyers in order to treat bars having different diameters.

14. A bar deburring plant according to claim 6, wherein each of said first and second upper pressing elements comprises chains.

* * * * *